(12) United States Patent
Kaldas et al.

(10) Patent No.: US 9,116,934 B2
(45) Date of Patent: Aug. 25, 2015

(54) HOLISTIC DATABASE RECORD REPAIR

(75) Inventors: Ihab Francis Ilyas Kaldas, Waterloo (CA); Mohamed Yakout, Doha (QA); Ahmed K. Elmagarmid, Doha (QA)

(73) Assignee: QATAR FOUNDATION, Doha (QA)

( * ) Notice: Subject to any disclaimer, the term of this patent is extended or adjusted under 35 U.S.C. 154(b) by 99 days.

(21) Appl. No.: 13/218,698

(22) Filed: Aug. 26, 2011

(65) Prior Publication Data

US 2013/0054541 A1  Feb. 28, 2013

(51) Int. Cl.
*G06F 17/30* (2006.01)

(52) U.S. Cl.
CPC .... *G06F 17/30303* (2013.01); *G06F 17/30598* (2013.01)

(58) Field of Classification Search
CPC ................................................. G06F 17/30303
USPC ....................................................... 707/691
See application file for complete search history.

(56) References Cited

U.S. PATENT DOCUMENTS

| | | | |
|---|---|---|---|
| 7,296,011 B2 * | 11/2007 | Chaudhuri et al. ................... | 1/1 |
| 7,562,067 B2 * | 7/2009 | Chaudhuri et al. ................... | 1/1 |
| 2003/0097359 A1 * | 5/2003 | Ruediger ........................... | 707/6 |
| 2004/0003005 A1 * | 1/2004 | Chaudhuri et al. ........... | 707/200 |
| 2004/0107189 A1 * | 6/2004 | Burdick et al. .................... | 707/3 |
| 2004/0181527 A1 * | 9/2004 | Burdick et al. .................... | 707/6 |
| 2005/0102325 A1 * | 5/2005 | Gould et al. ................. | 707/104.1 |
| 2006/0155743 A1 * | 7/2006 | Bohannon et al. ............ | 707/102 |
| 2008/0243967 A1 * | 10/2008 | Bhatia et al. .................. | 707/206 |
| 2009/0006302 A1 * | 1/2009 | Fan et al. ......................... | 706/48 |
| 2010/0005048 A1 * | 1/2010 | Bodapati et al. ................ | 706/47 |
| 2010/0318499 A1 * | 12/2010 | Arasu et al. .................... | 707/693 |

FOREIGN PATENT DOCUMENTS

| | | |
|---|---|---|
| GB | 2493962 A | 2/2013 |
| WO | 2013029818 A1 | 3/2013 |

OTHER PUBLICATIONS

Lee et al. "Cleansing Data for Mining and Warehousing". 1999. In Proceedings of the 10th International Conference on Database and Expert Systems Applications (DEXA '99). Springer-Verlag, London, UK, UK, pp. 751-760.*

Zhao, Li. "Efficient and effective data cleansing for large database". 2002. Thesis submitted for the degree of Doctor of Philosophy. National University of Singapore, Department of Computer Science.*

Ananthakrishna et al. "Eliminating fuzzy duplicates in data warehouses". 2002. In Proceedings of the 28th international conference on Very Large Data Bases (VLDB '02). VLDB Endowment. pp. 586-597.*

(Continued)

*Primary Examiner* — James E Richardson
(74) *Attorney, Agent, or Firm* — Mossman Kumar & Tyler PC

(57) ABSTRACT

A computer implemented method for repairing records of a database, comprises determining a first set of records of the database which violate a functional dependency of the database, determining a second set of records of the database comprising duplicate records, computing a cost metric representing a measure for the cost of mutually dependently modifying records in the first and second sets, modifying records in the first and second sets on the basis of the cost metric to provide a modified database instance.

7 Claims, 4 Drawing Sheets

(56) References Cited

OTHER PUBLICATIONS

Beskales et al. "Sampling the repairs of functional dependency violations under hard constraints." 2010. Procedures of the VLDB Endowment. vol. 3, Issue 1-2. pp. 197-207.*

Galhardas, Helena et al., "Declarative Data Cleaning: Language, Model, and Algorithms", Sep. 2001; XP002680980. Retrieved from the Internet: URL:http://www.vldb.org/conf/2001/P371.pdf [retrieved on Jul. 15, 2012].

Bohannon Philip et al., "A cost-based model and effective heuristic for repairing constraints by value modification", Journal of the Association for Computing Machinery, ACM, New York, NY, US, Jun. 14, 2005, pp. 143-154, XP007920868.

Kaewbuadee, Kollayut et al., "Data Cleaning Using FD From Data Mining Process"; May 16, 2006. XP007920865. Retrieved from the Internet: URL:http://www.iadis.org/Multi2006/Papers/16jF026 DS.pdf [retrieved on Jul. 24, 2012].

Written Opinion from International Appln PCT/EP2012/060029, dated Aug. 8, 2012.

Muller, H; et al, "Problems, Methods. and Challenges in Comprehensive Data Cleansing"; XP007920863 (2003; Retrieved from the Internet: URL:http://www.dbis.informatik.hu-berlin. dejfileadminjresearchjpapersjtechreportsj2003-hub ib 164-mueller. pdf [retrieved on Jul. 24, 2012].

* cited by examiner

HOLISTIC DATABASE RECORD REPAIR

The present invention relates to holistic database record repair.

BACKGROUND

A database is a collection of information arranged in an organized manner. A typical database might include medical, financial or accounting information, demographics and market survey data, bibliographic or archival data, personnel and organizational information, public governmental records, private business or customer data such as addresses and phone numbers, etc.

Such information is usually contained in computer files arranged in a pre-selected database format, and the data contents within them can be maintained for convenient access on magnetic media, both for storage and for updating the file contents as needed.

Poor data quality can have undesirable implications for the effectiveness of a business or other organization or entity. For example, in healthcare, where incorrect information about patients in an Electronic Health Record (EHR) may lead to wrong treatments and prescriptions, ensuring the accuracy of database entries is of prime importance.

A large variety of computational procedures for cleaning or repairing erroneous or duplicate entries in databases have been proposed. Typically, such procedures can automatically or semi-automatically identify errors and, when possible, correct them. Typically, however, these approaches have several limitations relating to the introduction of new database errors as a result of changes that have been made. For example, a repair in order correct a functional dependency problem may lead to duplication errors. Similarly, deduplication can lead to functional dependency violations within a database.

SUMMARY

According to an example, there is provided a computer implemented method for repairing records of a database, comprising determining a first set of records of the database which violate a functional dependency of the database, determining a second set of records of the database comprising duplicate records, computing a cost metric representing a measure for the cost of mutually dependently modifying records in the first and second sets; modifying records in the first and second sets on the basis of the cost metric to provide a modified database instance. Duplicate records can be determined using a duplication mechanism to group duplicate records into respective clusters, wherein records within respective ones of the clusters represent the same entity. In an example, a set of equivalence classes for records of the first and second sets consisting of multiple record-attribute pairs can be determined. Preferably, attribute values for records in respective ones of the equivalence classes are the same in the modified database instance. A pair of equivalence classes can be merged into a new class to resolve a functional dependency violation or to perform a deduplication. The first set of records of the database which violate a functional dependency of the database can be refreshed as can the second set of records of the database comprising duplicate records as a result of the step of merging.

According to an example, there is provided a computer implemented method for generating a set of updates for a database including multiple records, the method comprising performing a duplicate-record-aware repair of functional dependency violations for records of the database, and performing a functional-dependency-aware deduplication of records of the database.

According to an example, there is provided a computer program embedded on a non-transitory tangible computer readable storage medium, the computer program including machine readable instructions that, when executed by a processor, implement a method for updating a database comprising determining a first set of records of the database which violate a functional dependency of the database, determining a second set of records of the database comprising duplicate records, computing a cost metric representing a measure for the cost of mutually dependently modifying records in the first and second sets, modifying records in the first and second sets on the basis of the cost metric to provide a modified database instance. Duplicate records can be determined using a duplication detector to group duplicate records into respective clusters, wherein records within respective ones of the clusters represent the same entity.

A set of equivalence classes for records of the first and second sets consisting of multiple record-attribute pairs can be determined. Preferably, attribute values for records in respective ones of the equivalence classes are the same in the modified database instance. A pair of equivalence classes can be merged into a new class to resolve a functional dependency violation or to perform a deduplication. The first set of records of the database which violate a functional dependency of the database can be refreshed, as can the second set of records of the database comprising duplicate records as a result of the step of merging.

According to an example, there is provided a computer program embedded on a non-transitory tangible computer readable storage medium, the computer program including machine readable instructions that, when executed by a processor, implement a method for updating a database comprising performing a duplicate-record-aware repair of functional dependency violations for records of the database and performing a functional-dependency-aware deduplication of records of the database.

DETAILED DESCRIPTION

According to an example, there is provided a method for repairing records of a database which can be inconsistent, incorrect or missing due to duplication and inconsistencies with respect to integrity constraints of the database. Accordingly, deduplication can be performed, which determines and merges duplicate records, as well as the repairing of functional dependency (FD) violations.

Deduplication utilises a measure of similarity or closeness between records in a database to determine candidacy for duplicates. FD repair utilises the notion that the minimal amount of changes to make a database consistent are more likely to be correct. However, when the two tasks are applied one after the other (e.g., deduplication and then data repair), it is atypical for the resultant database to be consistent and free of duplicates because, after FD repair, records can change and new duplicate records may emerge. Further, after deduplication and the merging of duplicates, violations to constraints may emerge in the database. The interaction between the two problems is illustrated in FIG. 1 which is a schematic representation of a small database instance.

Figure 1:
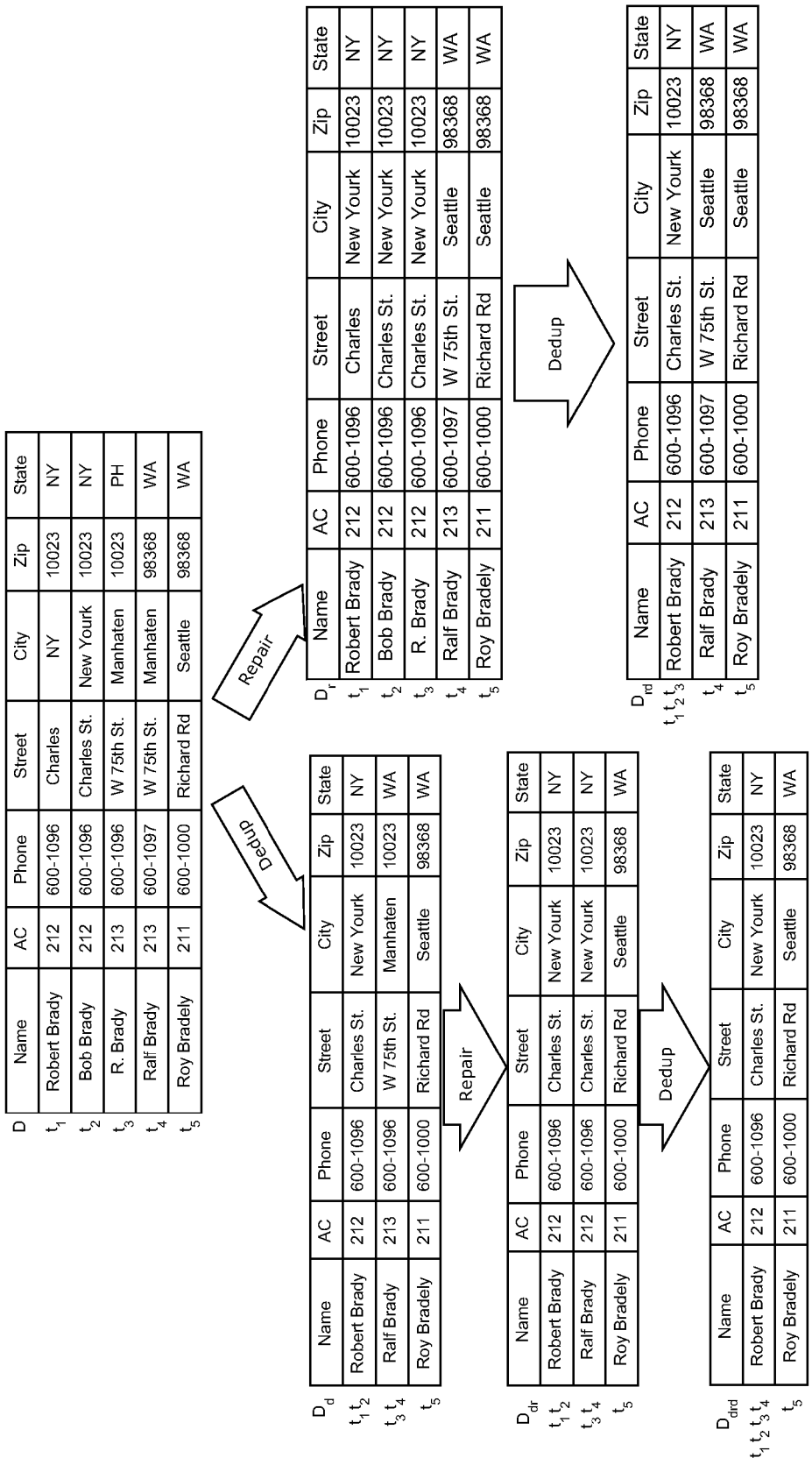
FIG. 1 is a schematic representation of a small database instance.

The database of FIG. 1 includes records that relate personal information of certain people. That is, the database attributes are: Name, telephone information: area code (AC) and Phone; address information: Street, City, State and Zip. In connection with the example of FIG. 1, there are defined a set of functional dependency constraints, $F_1$, $F_2$ and $F_3$:

a. $F_1$: City, Phone→AC, Street, Zip, State
b. $F_2$: Zip→City, State
c. $F_3$: Street, City→Zip The initial instance of the database of figure is D, which contains violations with respect to the specified FDs. For example, records $t_2$ and $t_3$ violate $F_2$ since they agree on the Zip attribute, but do not agree on the City and State attributes. Similarly, $t_3$ and $t_4$ violate $F_4$. Also note that D contains duplicate records. For example, $t_1$ and $t_2$ are candidates to be duplicates due to the similarities between their attributes values.

In order to repair the database instance D, a deduplication operation could be applied. In this case, instance $D_d$ would be obtained. The deduplication considers that $\{t_1, t_2\}$ and $\{t_3, t_4\}$ are two clusters of duplicate records due to the similarity between the attributes values, while $\{t_5\}$ remains in a cluster by itself. The instance $D_d$ is arrived at by merging each cluster of duplicates.

After a deduplication step, $D_d$ is inconsistent with respect to the FDs, since the two resulting records from the merge of $\{t_1, t_2\}$ and $\{t_3, t_4\}$ violate $F_2$. Therefore, the violations now need to be repaired. Violations with respect to $F_2$ can be resolved by making the affected records agree on City and State attributes, which in turn triggers another violation to $F_1$ to be resolved by making the records $\{t_1, t_2\}$ and $\{t_3, t_4\}$ agree on the AC and Street attributes. Finally, the instance $D_{dr}$ (D after applying deduplication followed by an FD repair) is obtained. Applying a deduplication operation to instance $D_{dr}$ reveals that the records $\{t_1, t_2\}$ and $\{t_3, t_4\}$ are duplicates after the repair, and they should be merged to finally obtain the instance $D_{drd}$.

Returning back to the original instance D and assuming that constraints violations are repaired first, one possible repair is shown in instance $D_r$. Note that in $D_r$, records $\{t_1, t_2, t_3\}$ are more likely to be duplicates due to the similarity of their attributes values, and both $t_4$ and $t_5$ appear to be distinct records. By merging the records of $\{t_1, t_2, t_3\}$ instance $D_{rd}$ is obtained. The example of FIG. 1 therefore shows that deduplication may cause violation of database constraints and that the repair of constraints violations may cause new candidate duplicates to appear in a database instance.

The illustrated interaction between the two problems indicates that deduplication and merging records should be aware of the constraints and consistency of the database, while repairing FD inconsistency should be aware of the identified duplicates. As illustrated in the example of FIG. 1, the sequence of applying FD repair and deduplication affects the final database instance obtained. The space of possible clean instances is exponential because of the number of possibilities for repairing FD violations and the number of ways to merge duplicate records. According to an example, there is provided a method for generating a set of updates for a database that seeks a clean instance with minimum distance from the original database instance. In an example, a clean instance of a database is free from FD violations and unwanted duplicate records.

In an example, a database instance D over a relation schema R is considered, with attr(R) denoting its set of attributes. The domain of an attribute A∈attr(R) is denoted by dom(A). A set of constraints Σ is defined over R in the form of a set of FDs, and t[A] denotes the value of a given attribute A∈attr(R) in a database record t. An FD has the form of X→Y, where X ⊂ attr(R) (left hand side, LHS) and Y ⊂ attr(R) (right hand side, RHS) are subsets of the attributes attr(R). An instance D satisfies an FD, F:X→Y if, for every pair of records $t_1, t_2 \in D$ $t_1[X]=t_2[X]$, then $t_1[Y]=t_2[Y]$. A database instance D is said to satisfy the constraints Σ if it satisfies every FD F∈Σ.

In an example, FD violations can be resolved as follows. Given $t_1, t_2$ that violate FD X→Y (or $t_1, t_2 | \neq F$) because $t_1[X]=t_2[X]$, but $t_1[Y]\neq t_2[Y]$, either modify $t_1[Y]$ such that $t_1[Y]=t_2[Y]$ or change the values of $t_1[X]$ such that $t_1[X]\neq t_2[X]$. For example, in instance D of FIG. 1, $\{t_1, t_2\}$ violate $F_2$. To resolve this violation, a modification can be performed so that $t_1$[City] is changed to 'New York' or $t_2$[Zip] is changed to a value which is not equal to '10023'.

In an example, respective clusters of candidate duplicate records can be merged (or fused) into a single record using a merging function using any one of several techniques that have been proposed to detect duplicate records. Typically, the merging of duplicate records will result in a record that is close to all the records within the cluster in question. Accordingly, a deduplication mechanism Dup operates to partition a database instance D into a set of clusters Dup(D)= $\{C_1, C_2, \ldots, C_m\}$ such that $D=\cup_{\forall i} C_i$. A merger M of a cluster C of duplicate records picks a value $v_A$ for each attribute such that $t[A]=v_A$ for all t∈C. For example, in the instance D of FIG. 1, $t_1$ and $t_2$ may be in a cluster of duplicates. In the instance $D_d$, a single record replacement for the two records is constructed from $\{t_1, t_2\}$. In an example, a deduplication mechanism can be any suitable deduplication mechanism suitable for determining candidate duplicate entries for records of a database.

According to an example, a link between deduplication and FD repair occurs in that both define equivalence between attribute values. For a cluster of duplicate records, all their attributes values should typically be equivalent. That is, for an attribute A ∈ attr(R), t[A] should be the same for all t∈C, where C is a cluster of duplicates. On the other hand, consider an FD F:X→Y. If there is a group of records S where t[X] are the same for all t∈S, then t[Y] should be equivalent and have the same value for all t∈S.

Equivalence due to deduplication is conditioned based on decisions obtained from a deduplication mechanism, Dup, which depends on the attribute values of records. Equivalence due to FDs is conditioned based on the equality of the LHS attribute values. Such equivalence can be represented in an equivalence relation that involves complex dependencies.

According to an example, a method for repairing a database provides a modified database instance D' such that:

1. |D'|≤|D|;
2. D' satisfies the constraints Σ
3. |Dup(D')|=|D'|; and
4. D' is produced by introducing minimal changes to D That is, in terms of item 3, applying the deduplication mechanism Dup on D does not detect new duplicates. A data cleaning process to get D' from D requires a sequence of value modification operations and the replacement of duplicates with a single record. According to an example, the cost of a cleaning process to repair a database in order to arrive at a modified instance can be defined as:

$$\text{Cost}(D, D') = \sum_{\forall t \in D, M(t) = t' \in D', A \in attr(R)} dist_A(t[A], t'[A])$$

where M(t) maps t∈D to the record t'∈D', which is the corresponding record for t after merge and repair operations. Note that merging a cluster of duplicate records has the cost of modifying all the records values to the same value.

The function $dist_A(t[A], t'[A])$ is a distance function for the domain values of attribute A that, in an example, returns a score between 0 and 1, where 0 signifies an exact match. Examples of distance functions include the Edit distance and Jaro for string attributes; and the normalized distance for numerical attributes. That is, given two numbers {a, b}∈dom (A), $dist_A(a, b)=(|a-b|)/(max(A)-min(A))$, where max(A) and min(A) are the maximum and minimum values in dom (A), respectively. Other alternatives are possible as will be appreciated.

According to an example, an FD repair is determined by performing a minimal amount of changes to a database instance in order to make it consistent or clean, thereby resulting in a modified database instance. In terms of merging a cluster of duplicate records, a single record is determined which is used as a replacement for the corresponding cluster of records. Typically, the record that is close to all the records within the cluster is the selected one. Implicitly, this can be interpreted as finding the minimal amount of changes to attributes' values to make the records within a cluster identical. Accordingly, given a database D, a duplication mechanism Dup and a set of constraints Σ, a method according to an example determines a modified database instance D' for which the cost associated with arriving at the modification, Cost(D, D'), is minimum.

According to one example, a database can be initially repaired such that it is consistent with respect to a set of given FDs. The output consistent database instance can then be used in the process of identifying duplicate records to be merged. A merger can result in a new record that is composed of a combination of attributes values of the original records that are being merged. Therefore, a simple merge for the duplicate records may introduce violations to the given FDs. Accordingly, a consistency aware merger (CAM) of a set of records can be used in the example. The main purpose is to produce a consistent database while making all identified clusters of duplicates identical, such that the final repaired database instance can be constructed, such as by using a "select distinct" SQL statement for example.

A database instance D', which is arrived at as a result of a CAM to an instance D, is defined in an example as a database in which:

all records in D are moved to D'
D' satisfies the constraints Σ, and
for each cluster of duplicates C∈Dup(D), C's records appear identical in D'

According to an example, the requirements for D' are further qualified such that, given a database D, a duplication mechanism Dup and a set of constraints Σ, a cost associated with arriving at a modified database instance D', Cost(D, D'), is minimised.

If the database D is consistent (after repairing the FD violations), then, according to an example, a record t from each cluster C is selected and t'=t∀t'∈C. That is, the records of C are made identical to the selected record t. The output of the merger is thus consistent with respect to the given FDs.

The selected record, which is used to represent the cluster, may not be the best representation for the entity. Typically, the record that is close to all the records within the clusters is a good representation, and moreover, it will encounter the least amount of changes to the cluster of records to make them identical.

According to an example, identified duplicates can be considered as additional constraints to be considered as well as Σ when repairing a database. Since deduplication identifies equivalence between attributes' values for a given cluster of duplicates, similarly, the FD defines equivalence between the RHS attributes conditioned on the equality on the LHS attributes. Accordingly, a consistency aware merger can be encoded into a single FD repair problem by defining identified duplicates as an additional FD constraint, such that, in order to arrive at a modified database instance, a method can include the steps:

1. Construct a new instance D" with the new relation R" such that:
2. R" is the same as R after addition a new attribute D_id.
3. For each cluster of duplicate records C, set t[D_id]=i in D".
4. Consider the new set of constraints Σ"=Σ∪{FD:D_id→attr(R)}.

A method according to an example finds an FD repair for D" without changing the attribute D_id. Then, for the constraints Σ" the duplicate records are determined while maintaining D"|=Σ. The modified database instance D" is determined by dropping the attribute D_id from the modified instance.

The first step to repair the FD violations in a repair-first data cleaning process is not informed by or dependent on the existence of duplicates however. The initial FD repair will find minimal changes to make the data consistent—however, if informed by the existence of duplicates, FD repair can help improve the accuracy of the identified clusters of duplicate records.

Therefore, according to an example, a holistic approach to solve deduplication and FD repair problems can be used. Equivalence classes are defined to provide a representation for the interactions between different equivalences introduced by the FDs and a selected deduplication mechanism. In an example, an equivalence class consists of record-attribute pairs (t, A), where t identifies a record and A is an attribute. The semantic of a set of an equivalence class eq is that attribute values t[A] have the same value for all (t, A) ∈eq in D'. Both FD resolution and deduplication defines equivalence between attributes values. For the case of FDs, given a FD, F:X→A and a set of records S that agree on the X attributes, then the set of record-attribute pairs {(t, A)|∀t∈S} must be in the same equivalence class. That is, the values t[A] should be equivalent (or equal) for all t∈S. For the case of deduplication, if a set of records C are identified to be duplicates by a selected deduplication mechanism Dup, then for each attribute A∈attr (R), the set of record-attribute pairs {(t, A)|∀t∈C} must be in the same equivalence class. That is, for each attribute A∈attr (R), all the values t[A] should be equivalent for all t∈C.

Equivalence classes provide a mechanism to aid in separating the decision of which attributes values need to be equivalent from the decision of what value should be assigned to the class itself. In an example, each class eq will have a target value, targ(eq) to be applied in the database. The chosen value for the target of an equivalence class results in a cost. The cost of setting targ(eq)=v is cost(eq, v)=$\Sigma_{(t,A)\in eq} dist_{A(t[A],v)}$. The cost of an equivalence class cost(eq) is the minimum cost, cost(eq, v), over the domain of values v.

According to an example, the resolution of FD violations and deduplication can be unified by merging equivalence classes. Given an FD, F:X→A and a set of records S that violates F because they agree on the X attributes, but do not agree on A, the violations can be resolved by merging the equivalence classes eq(t, A) for all t∈S. The function eq(t, A) refers to the equivalence class that contains (t, A).

Similarly for a set of duplicates C, the equivalence classes eq(t, A) for all t∈C should be merged for each attribute A∈attr (R).

Given a set of equivalence classes E, the merge cost of E is defined as:

$$mgcost(E) = cost(eq') - \Sigma_{eq \in E} cost(eq)$$

where $eq' = \cup_{eq \in E} eq$

Accordingly, it is the difference between the cost of the merged class and the sum of the costs of the individual classes in the set E.

Figure 2:
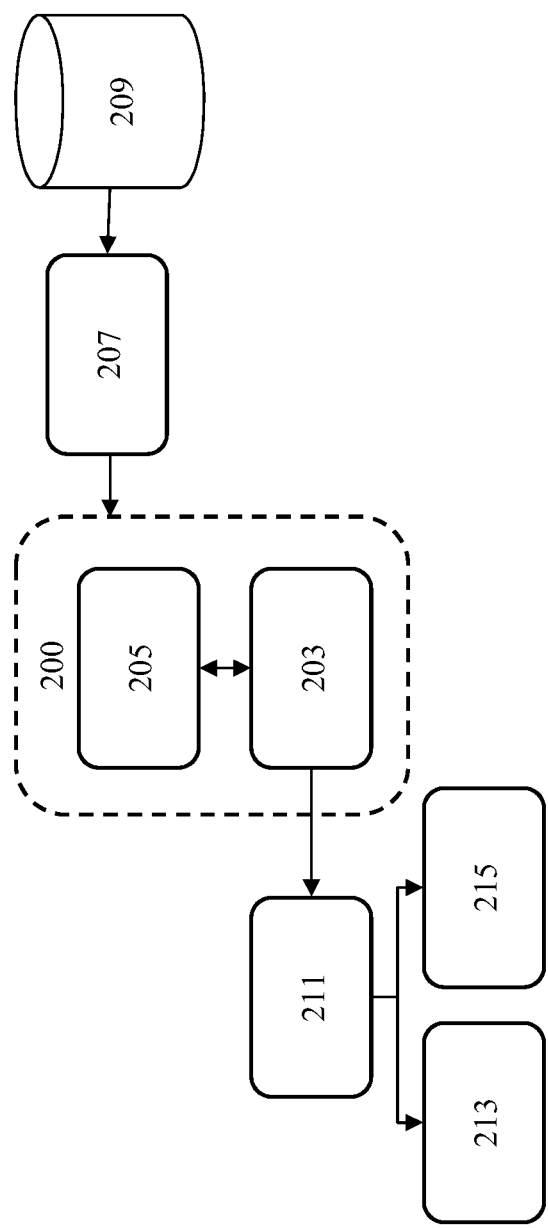
FIG. 2 is a schematic block diagram of a method according to an example.

A method according to an example uniformly treats FD violations and deduplication as conflicting equivalence classes to be resolved. FIG. 2 is a schematic block diagram of a method according to an example. In block 200, equivalence classes are initialized. More specifically, an equivalence class 203 is created for each record-attribute pair 205 from records 207 of a database 209. In block 211 equivalence classes 203 are merged until the FD constraints Σ are satisfied, and the duplicate records appear as identical, such that one record from each cluster of the identical duplicates is maintained. Accordingly, the result of the merge 211 is a set of records with FD constraints satisfied 213 and duplicate records merged 215. In an example, merging can be performed by a merge engine operable to process data representing equivalence classes 203 according to the method outlined herein.

According to an example, for each FD F:X→A, a list of records violist(F) that violate one or more constraints, F, is maintained. That is, for each record t∈violist(F), there is another record t', such that, t[X]=t'[X] and t[A]≠t'[A]. Similarly, for each attribute A∈attr(R), a list of records, dupList (A), which includes records that are duplicates but do not agree on an attribute A is maintained. That is, for each record t∈dupList(A), there is another record t', such that, {t, t'}∈C, and t[A]≠t'[A], where C is an identified or selected cluster of duplicates.

For each F∈Σ, violist(F) contains all records that violate F. For each attribute A∈attr(R), if the currently identified clusters of duplicates are {C$_1$,C$_2$, . . . , C$_m$}, then dupList(A) contains the records of each cluster C$_i$ if the records do not agree on attribute A. In an example, equivalence classes are initialized such that each (t, A) is a class with targ(eq(t, A))=t[A].

For example, with reference to FIG. 1: violist(F$_3$)={t$_3$, t$_4$}, violist(F$_1$) contains all the records, while violist(F$_2$) is initially empty. Assuming that Dup(D)={{t$_1$, t$_2$}, {t$_3$, t$_4$}, {t$_5$}}, then dupList(Phone)={t$_3$, t$_4$}, and dupList (Street)={t$_1$, t$_2$} for example.

According to an example, a repair operation is a merge of a set E of equivalence classes into a new class eq. A target, targ(eq) is calculated. If E was merged to resolve the violation of a set of records S with respect to an FD F:X→A, then S is removed from violist(F). If the merge was due to attribute A equivalence because of deduplication, then S is removed from dupList(A). In case the merge results in changing the targ(eq (t, A)), the violations and duplicates are recomputed. According to an example, the necessary violations can be computed as follows: for each F':X'→A'∈Σ and A∈{X'∪{A'}}; if S={t'|t, t'|≠F'} is not empty, then add {{t} ∪ S} to violist(F'). For example, with reference to FIG. 1: if S={t$_3$, t$_4$} for attribute 'ZIP', eq$_1$={(t$_3$, ZIP)} and eq$_2$={(t$_4$, ZIP)}. After merging eq$_1$ and eq$_2$, a new equivalence class eq={(t$_3$, ZIP), (t$_3$, ZIP)} is derived which means that t$_3$[Zip] must be equal to the targ (eq)='10023'. In this case, t$_4$[Zip] changes to '10023' instead of '98368', which was the previous target value of eq$_1$. Due to this update, t$_4$ may now violate other FDs that contain the modified attribute ZIP. Also, the similarity between t$_4$ and the other records has changed. Accordingly, deduplication needs to be recomputed again in order to update the dupList listing.

Figure 3:
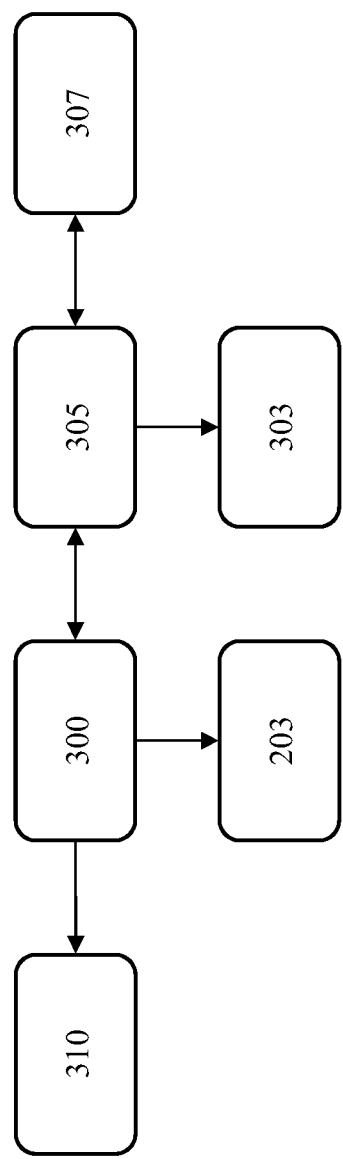
FIG. 3 is a schematic block diagram of a method according to an example.

FIG. 3 is a schematic block diagram of a method according to an example. An algorithm 300 starts by initializing the equivalence classes 203 as mentioned earlier. According to an example, algorithm 300 can be one which follows the following process:

```
1: ε = {(t, A)|∀ t ∈ D, ∀ A ∈ attr(R)}
2: ∀ eq(t, A) ∈ ε; targ(eq(t, A)) = t[A]
3: Dup(D) = {C₁ ..... Cₘ }
4: for all F ∈ Σ; vioList(F) = {t| ∃t's.t.{t, t'} |≠ F}
5: for all A ∈ attr(R); dupList(A) = [t| ∃t's.t.{t, t'} ∈
   C, t[A] ≠ t'[A]}
6: while vioList and dupList are not empty do
7:      (S, List) =PickOp( )
8:      MergeEqClasses(S. List)
9: end while
10: D' is obtained by setting t[A] = targ(eg(t, A)) for all t ∈
    D, A ∈ attr(R) and then apply the SQL select distinct
    attr(R) from D'.
```

In block 305 the next best set of equivalence classes to merge or the operation with the current least cost is selected using an algorithm such as below:

```
1: bestCost = ∞
2: for all F : X → A ∈ Σ, t ∈ vioList(F) do
3:      S = {t'|t[X] = t'[X]}
4:      curCost = mgcost(S, A)
5:      if cur Cost ; bestCost then
6:          sol = (S.vioList(F)); bestCost = curCost;
7:      end if
8: end for
9: for all A ∈ attr(R), t ∈ dupList(A) do
10:     S = cluster(t)
11:     curCost = mgcost(S, A)
12:     if cur Cost ; bestCost then
13:         sol = (S.dupList(F)); bestCost = curCost;
14:     end if
15: end for
16: return sol;
```

That is, a set of records S and a list that refers to either vioList or dupList is computed according to the algorithm used in block 305. The algorithm of block 305 typically searches among all current conflicting equivalences in the database (due to FD violation or deduplication) and selects the least cost equivalence to apply.

According to an example, a set of equivalence classes can be merged according to an algorithm in block 307, which can be an algorithm such as below:

```
1: E = {eq(t. A)|∀ t ∈ S}
2: eq_A = ∪_{e∈E} e
3: ε = (ε - E) ∪ {eq_A }
4: List = List - S
5: for all t ∈ S do
6:      if targ(eq(t, A)) ≠ targ(eq_A) then
7:          for all F' : X' → A ∈ Σ s.t. A ∈ X' ∪ {A'} do
8:              S_s = (t'|t, t' |= F'}
9:              S_u = {t'|t, t' |≠ F'}
10:             if (S_s ≠ φ) then vioList(F')- = S_s ∪ {t}
11:             if (S_u ≠ φ) then vioList(F')∪ = S_s ∪ {t}
12:             Recompute Dup for t and update dupList(A) for each
                A ∈ attr(R)
13:         end for
14:     end if
```

-continued

15:     eq(t, A) = $eq_A$
16: end for

Block 307 takes the output of block 305 as input parameters, which is a set S of records and the list List. An attribute is A if List is vioList(F:X→A), or it is dupList(A). Then, using the set of records S, the set E of equivalence classes to be merged is obtained. Subsequently, the consequence of changing the target values to update the data structures vioList and dupList is dealt with. A modified database instance 310 (D') is obtained from block 300 by setting t[A]=targ(eq(t,A)) for t∈D, A∈attr(R). In an example, a suitable filter can then be applied, such as an SQL "select distinction" command over attr(R) from D'.

Figure 4:
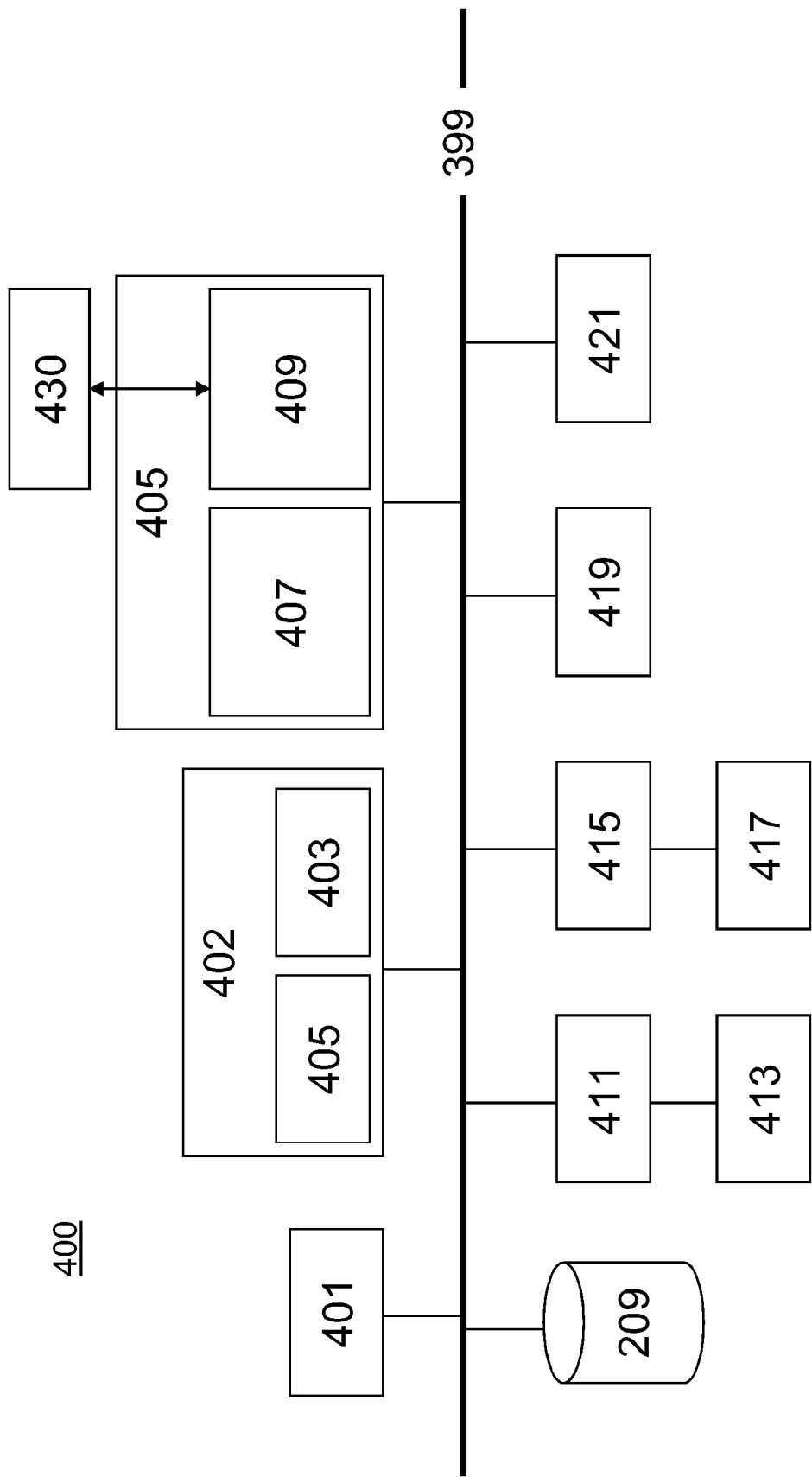
FIG. 4 is a schematic block diagram of an apparatus according to an example.

FIG. 4 is a schematic block diagram of an apparatus according to an example suitable for implementing any of the system or processes described above. Apparatus 400 includes one or more processors, such as processor 401, providing an execution platform for executing machine readable instructions such as software. Commands and data from the processor 401 are communicated over a communication bus 399. The system 400 also includes a main memory 402, such as a Random Access Memory (RAM), where machine readable instructions may reside during runtime, and a secondary memory 405. The secondary memory 405 includes, for example, a hard disk drive 407 and/or a removable storage drive 430, representing a floppy diskette drive, a magnetic tape drive, a compact disk drive, etc., or a nonvolatile memory where a copy of the machine readable instructions, or software may be stored. The secondary memory 405 may also include ROM (read only memory), EPROM (erasable, programmable ROM), EEPROM (electrically erasable, programmable ROM). In addition to software, data representing any one or more of updates, possible updates or candidate replacement entries, and listings for identified tuples may be stored in the main memory 402 and/or the secondary memory 405. The removable storage drive 430 reads from and/or writes to a removable storage unit 409 in a well-known manner.

A user interfaces with the system 400 with one or more input devices 411, such as a keyboard, a mouse, a stylus, and the like in order to provide user input data. The display adaptor 415 interfaces with the communication bus 399 and the display 417 and receives display data from the processor 401 and converts the display data into display commands for the display 417. A network interface 419 is provided for communicating with other systems and devices via a network (not shown). The system can include a wireless interface 421 for communicating with wireless devices in the wireless community.

It will be apparent to one of ordinary skill in the art that one or more of the components of the system 400 may not be included and/or other components may be added as is known in the art. The system 400 shown in FIG. 4 is provided as an example of a possible platform that may be used, and other types of platforms may be used as is known in the art. One or more of the steps described above may be implemented as instructions embedded on a computer readable medium and executed on the system 400. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

According to an example, equivalence classes 405 can reside in memory 402 having been derived from records of a database 209. In an example, one or more of algorithms of blocks 300, 305 or 307 can reside in memory 402 such as to provide respective engines 403 for cleaning, merging and selecting records of a database, including a modified instance of a database for example. That is, engine 403 can be a cleaning engine or a merge engine according to an example, which are operable to perform the processes associated with the tasks of blocks 300, 305, 307 for example.

A database 209 is shown in FIG. 4 as a standalone database connected to bus 399. However, it can be a database which can be queried and have data written to it from a remote location using the wired or wireless network connections mentioned above. Alternatively, database 209 may be stored in memory 405, such as on a HDD of system 400 for example.

What is claimed is:

1. A computer implemented method for repairing records of a database, comprising:
   determining a first set of records of the database that violate a functional dependency from a set of functional dependencies;
   determining a second set of records of the database using a duplication mechanism wherein the second set of records are duplicate records;
   appending a duplicate identifier to each record in the second set of records, wherein the duplicate identifier is identical for each record in the second set of records;
   updating the set of functional dependencies to union a functional dependency based on the duplicate identifier;
   determining a set of equivalence classes for records of the first set of records and the second set of records consisting of multiple record-attribute pairs;
   computing a cost metric representing a measure for the cost of modifying records in the first and second sets;
   merging a pair of equivalence classes of the first set of records and the second set of records into a new class to resolve a functional dependency violation and to perform a duplication of duplicate records;
   computing a merge cost metric of the merged pair of equivalence classes using the cost metric of each respective class; and
   modifying records in the first and second sets on the basis of the merge cost metric to provide a modified database instance.

2. A method as claimed in claim 1, further comprising determining a set of equivalence classes for records of the first and second sets consisting of multiple record-attribute pairs, wherein attribute values for records in respective ones of the equivalence classes are the same in the modified database instance.

3. A method as claimed in claim 1, further comprising:
refreshing the first set of records of the database which violate a functional dependency of the database; and
refreshing the second set of records of the database comprising duplicate records as a result of the step of merging.

4. A computer program embedded on a non-transitory tangible computer readable storage medium, the computer program including machine readable instructions that, when executed by a processor, implement a method for updating a database comprising:
determining a first set of records of the database which violate a functional dependency of the database from a set of functional dependencies;
determining a second set of records of the database using a duplication mechanism wherein the second set of records are duplicate records
appending a duplicate identifier to each record in the second set of records, wherein the duplicate identifier is identical for each record in the second set of records;
updating the set of functional dependencies to union a functional dependency based on the duplicate identifier;
determining a set of equivalence classes for records of the first set of records and the second set of records consisting of multiple record-attribute pairs and instructions that, when executed by the processor, implement a method for updating a database further comprising determining a cost metric representing a measure for the cost of modifying records in the first and second sets;
merging a pair of equivalence classes of the first set of records and second set of records into a new class to resolve a functional dependency violation and to perform a deduplication of duplicate records;
computing a merge cost metric of the merged pair of equivalence classes using the cost metric of each respective class; and
modifying records in the first and second sets on the basis of the cost metric to provide a modified database instance.

5. The computer program embedded on a non-transitory tangible computer readable storage medium as claimed in claim 4, further comprising instructions that, when executed by the processor, implement a method for updating a database further comprising:
determining duplicate records using a duplication detector to group duplicate records into respective clusters, wherein records within respective ones of the clusters represent the same entity.

6. The computer program embedded on a non-transitory tangible computer readable storage medium as claimed in claim 4, further comprising instructions that, when executed by the processor, implement a method for updating a database further comprising determining a set of equivalence classes for records of the first and second sets consisting of multiple record-attribute pairs, and instructions that, when executed by the processor, implement a method for updating a database wherein attribute values for records in respective ones of the equivalence classes are the same in the modified database instance.

7. The computer program embedded on a non-transitory tangible computer readable storage medium as claimed in claim 4, further comprising instructions that, when executed by the processor,
refresh the first set of records of the database which violate a functional dependency of the database; and
refresh the second set of records of the database comprising duplicate records as a result of the step of merging.

* * * * *